United States Patent [19]

Culross

[11] Patent Number: 5,650,371
[45] Date of Patent: Jul. 22, 1997

[54] HETEROGENEOUS CATALYSTS VIA IMPREGNATION PROCESS

[75] Inventor: Claude C. Culross, Baton Rouge, La.

[73] Assignee: Exxon Research and Engineering Company, Florham Park, N.J.

[21] Appl. No.: 578,820

[22] Filed: Dec. 26, 1995

[51] Int. Cl.$^6$ ................ B01J 37/00; B01J 23/56
[52] U.S. Cl. ............ 502/305; 502/313; 502/314; 502/325; 502/327; 502/332; 502/333; 502/334; 502/335; 502/336; 502/514
[58] Field of Search .................. 502/514, 305, 502/313, 314, 325, 327, 332, 333, 334, 335, 336

*Primary Examiner*—Glenn Caldarola
*Assistant Examiner*—In Suk Bullock
*Attorney, Agent, or Firm*—Llewellyn A. Proctor; Jay Simon

[57] ABSTRACT

A continuous impregnation process for the preparation of a heterogeneous catalyst. A catalytic metal, or metals, is composited with a porous solids support component via the steps of: (i) forming a slurry of porous, particulate solids dispersed in an organic, or hydrocarbon solvent, preferably all organic, or hydrocarbon solvent which forms an azeotrope with water, (ii) adding, in aqueous solution, preferably continuously, one or more of a salt, acid, or compound of the catalytic metal, or metals, which is insoluble in the organic, or hydrocarbon solvent to which it is added; the aqueous solution contacting the porous, particulate support solids wicking into the pores to disperse the salt, acid or compound of the catalytic metal, or metals, therein, (iii) stirring, preferably vigorously and continuously, the slurry containing the porous, particulate solids, water, and salt, acid, or compound of the catalytic metal, or metals, and (iv) distilling at a temperature sufficient to vaporize and remove the water from the support component, and slurry, to leave the catalytic metal, or metals, component deposited within the pores of the support component of the catalyst. The catalyst is next recovered, and calcined.

10 Claims, No Drawings

HETEROGENEOUS CATALYSTS VIA IMPREGNATION PROCESS

1. FIELD OF THE INVENTION

This invention relates to a process for the preparation of heterogeneous supported metal catalysts. In particular, it relates to a continuous process for the impregnation of a catalytic metal, or metals, upon a porous solids support component to form a catalyst.

2. BACKGROUND

Methods for the preparation of heterogeneous supported metal catalysts by application of metal salt(s) solutions to a porous solids support component are well known. A typical first step in the preparation of a supported catalyst is to apply an aqueous solution of a salt of a catalytic metal, or metals, to the solids support. "Incipient wetness", sometimes referred to as "pore volume saturation", is a typical method of impregnating a solids support with the catalytic metal salt because it assures a higher dispersion of the metal salts within the pores of the support.

The incipient wetness technique requires the following steps, to wit: (1) forming a saturated aqueous solution of a salt of the catalytic metal, or metals, (2) contacting the support with a limited volume amount of the catalytic metal salt solution to imbibe the solution; the volume of the catalytic metal salt solution approaching but not exceeding the measured pore volume of the support, (3) removing the imbibed water from the support by thermal drying, (4) measuring the intermediate, lower pore volume of the support solids, and (5) repeating steps (1) through (4) until the desired metals loading is achieved, adjusting solution volumes between each cycle of steps to the lower pore volume.

While the conventional incipient wetness method is widely used, and has proven successful, the method is particularly laborious if salt solubility or support pore volumes are low, or high metals loadings are desired. Also, repeated cycles of drying lowers the available pore volume of the support, as a consequence of which the diffusional limitations of a catalyst are increased. Thus, an improved method of impregnating the porous solids support to obviate these prior art deficiencies in forming catalysts would prove beneficial, and supply a need of the industry.

3. THE INVENTION

The present invention, which supplies this need, relates to an impregnation process for the preparation of heterogeneous supported metal catalysts which comprises the steps of:

(i) forming a slurry of porous, particulate solids dispersed in an organic, or hydrocarbon solvent, preferably an organic, or hydrocarbon solvent which forms an azeotrope with water, (ii) adding, preferably continuously, to said slurry an aqueous solution of one or more of a salt, acid, or compound of the catalytic metal, or metals, which is insoluble in the organic, or hydrocarbon solvent to which it is added; the aqueous solution contacting the porous, particulate support solids and wicking into the pores to disperse the salt, acid or compound of the catalytic metal, or metals, therein, (iii) stirring, preferably vigorously and continuously, the slurry containing the porous, particulate solids, water, and salt, acid, or compound of the catalytic metal, or metals, and (iv) distilling at a temperature sufficient to vaporize and remove the water from the support component and slurry to leave the catalytic metal, or metals, component deposited within the pores of the support component of the catalyst.

The hydrocarbon solvent is generally removed before calcination. The catalyst, which is dried by the distillation, is then calcined.

In conducting the process, one begins with a slurry of the particulate support in an organic, or hydrocarbon solvent which meets two essential criteria: (1) the solvent will not dissolve a significant amount, if any, of the catalytic metal salt, acid or compound, added as an aqueous solution to the slurry, and (2) the solvent is immiscible with water; and preferably will form an azeotrope with water. Preferably, the catalytic metal salt solution is continuously added to the slurry, while the slurry is stirred sufficiently to cause uniform wetting of the surface of the particulate support material. On contact with the support, the aqueous solution almost instantaneously wicks into the pore volume of the support solids. Water is removed from the support solids as a vapor; preferably at high metals solution addition rate, either at the boiling point of water in the case where the hydrocarbon solvent does not form an azeotrope with water and possesses a boiling point above the boiling point of water, or at the boiling point of the solvent in the case where the hydrocarbon solvent does not form an azeotrope with water and possesses a boiling point below the boiling point of water, or at the azeotropic boiling point in the case where the hydrocarbon forms an azeotrope with water. When the water content of the vapor is that of the azeotropic composition, the boiling point of the slurry will lie at the azeotropic boiling point of solvents that form azeotropes, the preferred condition. When the water content of the vapor lies below that of the azeotropic composition, the boiling point will lie between the azeotropic boiling point of solvents that form azeotropes and the boiling point of the pure solvent. At low water removal rates, the slurry boiling point is close to that of the pure solvent, regardless of whether the solvent forms an azeotrope with water or not, and regardless of whether the pure solvent boiling point lies below the boiling point of water. The use of a solvent which forms an azeotrope with water and has a boiling point below 100° C. (the boiling point of water) precludes a metal, or metals containing solution from being forced out of the pores by solution boiling action inside the pores. The use of a solvent which forms an azeotrope with water and has a boiling point above 100° C. (the boiling point of water), in combination with a water removal rate sufficient to establish azeotropic composition in the vapor, maintains a slurry boiling point below the boiling point of water, and thereby precludes a metal, or metals containing solution from being forced out of the pores by solution boiling action inside the pores. The time frame of water removal as an azeotrope is slower than pore filling by the aqueous solution. The capillary forces which drive solution into the pores are known to be quite high, and hence the net effect is that the metal salt is deposited within the pores of the support solids. The dry metal, or metals impregnated solids are recovered from the slurry, and calcined in a conventional manner.

In the practice of this invention it is desirable to maintain a low water inventory in the slurry to avoid overfilling the pores. Thus, in overfilling, some solution is forced to stay outside the pores, a condition which, on drying, will produce deposits outside the pores; a normally undesirable condition. A low water inventory, or water inventory which will not overfill the pores, will thus suppress the deposition or deposit, of the metal salt, acid or compound, outside the pores when drying. The continuous addition of the solution of the catalytic metal salt, acid or compound is thus adjusted to a rate of solution addition which will not overfill the pores, and which will balance the rate of removal of water by distillation. This balance can be accomplished, e.g., on the basis of volume of solution addition and water removal per unit time. This method also eliminates the need to measure intermediate support pore volumes; a time consuming practice that can be totally eliminated since removal of water at a certain volume/time rate necessarily continuously creates pore void volume into which metals solution can be added at that same rate. It is also helpful to use solutions of the catalytic metal salt, acid or compound slightly below saturation solubility to compensate for the slight amount of azeotroping water solution present before it wicks into the pore volume. However, increased solubility at temperatures above ambient will normally more than compensate this water loss.

The fraction of filled pore volume of the solids can be controlled during metals solution addition and water removal between nearly empty and essentially full (or beyond), depending on the type of metals distribution that is desired. For example, during an operation the metal can be distributed near the periphery of a particle as a rim by maintaining the pores in filled state, or state of incipient wetness. Azeotropic water removal at this condition necessarily occurs near the periphery of the solids particles, thereby causing metal precipitation near the peripheral surface of the solids. In forming a rim, the temperature of the azeotropic distillation also has an effect. For example, the removal of water from an aqueous solution of $Co(NO_3)_2 \cdot 6H_2O$ (melting point 55°–56° C.) from the filled pores as an azeotrope boiling below about 30° C. will deposit the cobalt near the periphery of the particles and produce a cobalt rim since the $Co(NO_3)_2 \cdot 6H_2O$ will not melt. However, the removal of water from an aqueous solution of $Co(NO_3)_2 \cdot 6H_2O$ at a temperature above 56° will produce a more uniform metal distribution because the whole of the pores will contain the dissolved salt. The fraction of filled pore volume, in any event, can consist of any portion of the total pore volume of the slurried support, ranging from zero (empty) to 100 percent, or completely filled. Compounds not melted by the azeotropic temperature, where the metal is deposited from filled pores, will thus favor the formation of a rim catalyst; a kind of metals distribution particularly favorable where the reaction is diffusion limited. On the other hand, pores which are less full, or removed under conditions where the azeotropic distillation is above the melting temperature of the metal-containing compounds, will form catalysts on which the metal, or metals, is more uniformly distributed.

The process of this invention can use any of the aqueous solutions of a salt, acid or compound of a catalytic metal, or metals, commonly employed to form catalysts by conventional incipient wetness techniques, and these solutions can be used to impregnate supports commonly employed in the formation of catalysts by conventional incipient wetness techniques. One, or several salts, acids or compounds of a catalytic metal, or metals, in water soluble form can, e.g., be dissolved in water, and the aqueous solution of the metal, or metals, added to the organic, or hydrocarbon solvent, contacted and imbibed into the pores of a previously pilled, pelleted, beaded, extruded, sieved or powdered particulate support, e.g., a refractory inorganic oxide support. Salts, acids or compounds of a catalytic metal can be dissolved in water to form separate solutions for sequential impregnation of the solids, or the salts, acids or compounds of a metal, or metals, can be dissolved in water to form separate solutions, the solutions admixed, and the admixed solution used for imbibing the metal, or metals, into the pores of a support. In compositing a metal, or metals, with a support essentially any water soluble compound of the selected metal can be used, e.g., nitrates, sulphates, carbonates, bicarbonates, acetates, etc. Exemplary of the catalytic metal, or metals, component of the water soluble salt, acid or compound for imbibing into a support is one or more of those selected from Group VIB or VIII of the Periodic Table Of The Elements (E. H. Sargent and Company, Copyright 1962, Dyna-Slide Company), e.g., chromium, molybdenum, tungsten, iron, cobalt, nickel, palladium, platinum, iridium, and rare earth metals of the lanthanum series. Such metallic component, or components, will typically comprise from about 0.1 percent to about 70 percent, or higher, of a metal, or metals, based on the total weight (dry basis) of the catalyst, dependent upon the nature of the catalytic metal, or metals, and the process in which the catalyst is to be employed.

Exemplary of supports which can be impregnated with aqueous solutions of the catalytic metal salt, acid or compound are alumina, amorphous silica-alumina, bentonite, clay, diatomaceous earth, zeolite, silica, magnesia, zirconia, titania and the like. A very useful support is silica or alumina to which, if desired, can be added a suitable amount of other refractory materials, e.g., zirconia, magnesia, titania, etc., usually in the range of about 1 to 20 percent, based on the weight of the support. Such supports suitably have surface areas of more than 50 $m^2/g$, preferably from about 100 to about 800 $m^2/g$, bulk densities of about 0.03 g/ml to about 1 g/ml, and average pore volumes greater than about 0.2 ml/g, suitably from about 0.2 ml/g to about 4 ml/g.

A wide variety of organic, or hydrocarbon solvents are suitable for the practice of this invention, the solvent necessarily being one which is immiscible in water, preferably one which will form an azeotrope with water, and not dissolve the salt, or salts, of the catalytic metal, or metals, added as a solution to a slurry of the particulate support solids in the solvent. Exemplary of such solvents are straight chain, branched chain or cyclic aliphatic hydrocarbons, saturated or unsaturated, substituted or unsubstituted, such as hexane, cyclohexane, etc.; aromatic hydrocarbons, substituted or unsubstituted, such as benzene, toluene, xylenes, ethyl benzene, cumene, etc. An extensive listing of useful binary azeotropes can be found, e.g., at Pages 6–12 of "Azeotropic Data", Volume 6 of the Advances In Chemistry Series (American Chemical Society, 1952; herewith incorporated by reference).

The invention will be more fully understood by reference to the following example illustrating the preparation of catalysts by the process of this invention, and data providing comparisons with the conventional incipient wetness technique.

The example immediately following describes a catalyst preparation of mixed oxides of cobalt and rhenium supported on silica.

EXAMPLE

To a glass reaction vessel was added 50 g of "fumed" silica (Cabot grade EH-5) and about 500 ml of cyclohexane. The glass reactor was equipped with a chilled condenser and Dean-Stark trap into which condensed azeotrope fell and separated into the hydrocarbon and water components. The Dean-Stark trap was graduated so that the accumulated volume was continuously monitored.

A stock solution was prepared consisting of 342.0 g cobalt nitrate hexahydrate, 11.88 g ca. 65 wt % aqueous Perrhenic acid solution, and 108.0 g de-ionized water.

During vigorous boiling of the cyclohexane slurry and continuous stirring, a total of 324 g of aqueous cobalt-rhenium stock solution was added to the silica-cyclohexane slurry. The rate of addition was adjusted to match the rate of water removal observed in the Dean-Stark trap. After the metal compound solution was completely added, heating was continued until water no longer accumulated in the Dean-Stark trap. In all, about 115 ml of water was collected.

Cyclohexane was removed on an evaporator, and the impregnated silica was dried overnight at 100°–110° C. After calcining at 125° C. for 30 minutes, 150° C. for 60 minutes, and 300° C. for 30 minutes, the Co—Re/$SiO_2$ catalyst was found to contain 40.0 wt % cobalt; surface area=154 $m^2$/g; pore volume=0.75 ml/g.

In contrast, the same ratio of silica and metal compounds, again applied as an aqueous solution, but without slurrying the silica in cyclohexane and removing the water as azeotrope, was found to contain 36.8 wt % cobalt, have a surface area of 150 $m^2$/g, and pore volume of 0.59 ml/g.

Thus, it is found that 20% less pore volume is lost during azeotropic impregnation; i.e., 0.75 ml/g vis-a-vis 0.59 ml/g. Raw fumed silica which has been milled to increase pore volume has a pore volume of 2.09 ml/g. Adding metal compounds decreases this by filling pore volume (fewer ml in the pore volume numerator), and by adding weight to the support (more g in the pore volume denominator). Using the measured amount of cobalt and the densities of the components of the catalyst, it is calculated that the azeotropically impregnated catalyst retains 98% of its original pore volume, corrected for pore filling and the added weight of metal compounds, while the conventionally prepared catalyst retains 68%.

Maintenance of the greater pore volume is a very important result since the catalyst made by the process of this invention has less diffusional limitations than one made by conventional techniques. This improvement, it is believed, results from the continuous azeotropic removal of water over a single cycle of preparation.

It is apparent that various modifications and changes can be made without departing the spirit and scope of the invention.

Having described the invention, what is claimed is:

1. An impregnation process for the preparation of a heterogeneous catalyst which comprises the steps of:

(i) forming a slurry of porous, particulate solids dispersed in a hydrocarbon solvent which is immiscible with water, (ii) adding to said slurry an aqueous solution of one or more of a salt, acid or compound of a catalytic metal, or metals, which is insoluble in the hydrocarbon solvent, the aqueous solution wicking into the pores of the solids to disperse the salt, acid or compound of the catalytic metal, or metals, therein, (iii) stirring the slurry to which is added the aqueous solution of the salt, acid or compound of the catalytic metal, or metals, and (iv) distilling at a temperature sufficient to vaporize and remove the water from the support component, and slurry, to leave the catalytic metal, or metals, component deposited within the pores of the support component of the catalyst.

2. The process of claim 1 wherein the aqueous solution of the salt, acid or compound of the catalytic metal, or metals, is added continuously to the slurry, the hydrocarbon solvent component of the slurry is one which can form an azeotrope with water, the slurry is continuously stirred, and water is continuously removed via azeotropic distillation from the pores of said porous solids, and slurry.

3. The process of claim 2 wherein the rate of addition of the aqueous solution of the salt, acid or compound of the catalytic metal, or metals, and the rate of removal of water via the azeotropic distillation are sufficient to avoid overfilling the available pore volume of the solids.

4. The process of claim 1 wherein the solids dispersed and slurried within the hydrocarbon solvent are selected from the group consisting of alumina, bentonite, clay, diatomaceous earth, zeolite, silica, magnesia, silica, an amorphous silica-alumina, magnesia, zirconia, and titania, and the catalytic metal, or metals, component of the salt, acid or compound contained within the aqueous solution wicked into the pores of the solids to form a catalyst is one selected from Group VIB or VIII metals of the Periodic Table of the Elements.

5. The process of claim 4 wherein the catalyst which is formed is one containing from about 0.1 percent of the catalytic metal or metals to about 70 percent, based on the total weight of the catalyst.

6. The process of claim 4 wherein the solids dispersed and slurried within the hydrocarbon solvent is silica or alumina.

7. The process of claim 6 wherein the silica contains from about 1 to about 20 percent of alumina, zirconia, magnesia, or titania and the alumina contains from about 1 to about 20 percent of silica, zirconia, magnesia or titania.

8. The process of claim 1 wherein the hydrocarbon solvent within which particulate solids are dispersed is one which will form an azeotrope with water, and the water is distilled from the pores of the porous solids and hydrocarbon slurry at the azeotropic boiling point.

9. A continuous impregnation process for the preparation of a heterogeneous catalyst which comprises the steps of:

(i) forming a slurry of porous, particulate solids dispersed in a hydrocarbon solvent which can form an azeotrope with water, (ii) adding continuously to said slurry an aqueous solution of one or more of a salt, acid or compound of a catalytic metal, or metals, which is insoluble in the hydrocarbon solvent, the aqueous solution wicking into the pores of the solids to disperse the salt, acid or compound of the catalytic metal, or metals, therein, (iii) stirring the slurry to which is added continuously the aqueous solution of the salt, acid or compound of the catalytic metal, or metals, and (iv) distilling continuously at the azeotropic boiling point, the water from the support component, and slurry, balancing the volume rate of addition of aqueous solution of the salt, acid or compound of the catalytic metal, or metals, and the volume rate of removal of water by distillation sufficient to avoid overfilling the available pore volume of the solids while leaving the catalytic metal, or metals, component deposited within the pores of the support component of the catalyst.

10. The process of claim 9 wherein the balance between the volume rate of addition of the aqueous solution of the salt, acid or compound of the catalytic metal, or metals, and the volume rate of removal of water via the azeotropic distillation are sufficient to maintain the porous solids in a state of incipient wetness.

\* \* \* \* \*